H. D. WILLIAMS.
POWER TRANSMISSION GEARING.
APPLICATION FILED MAY 22, 1907.

908,529.

Patented Jan. 5, 1909.
2 SHEETS—SHEET 2.

WITNESSES

INVENTOR
Harvey D. Williams
BY
Briesen & Knauth
ATTORNEYS

UNITED STATES PATENT OFFICE.

HARVEY D. WILLIAMS, OF WASHINGTON, DISTRICT OF COLUMBIA.

POWER-TRANSMISSION GEARING

No. 908,529.　　　　Specification of Letters Patent.　　　　Patented Jan. 5, 1909.

Application filed May 22, 1907. Serial No. 375,043.

*To all whom it may concern:*

Be it known that I, HARVEY D. WILLIAMS, a citizen of the United States, and a resident of Washington, District of Columbia, have invented certain new and useful Improvements in Power-Transmission Gearing, of which the following is a specification.

My invention has for its object the efficient transmission of large horse powers accompanied by changes in the number of revolutions and more particularly by reductions in number of revolutions from the driving shaft to the driven shaft of a ratio as great or greater than 10 to 1 in order to meet the conditions imposed by the marine steam turbine where a reduction in speed between the turbine and the screw propeller will conduce to the better efficiencies of both.

Attempts to use the common forms of toothed gearing for this purpose result in a construction which is prohibitory on account of its great weight and bulk. The difficulties met with are due, not so much to the lack of strength of the gears as to their poor wearing qualities and the great noise incident to the high speed.

The various kinds of gearing which have been used or proposed for the purpose indicated above, are objectionable for reasons such as low efficiency, great bulk, unsuitableness for the transmission of large horse powers, lack of flexibility (that is, in the matter of velocity ratio, permitting of none other than 2 to 1), and impossibility of using high speed on account of the presence of unbalanced centrifugal forces of great magnitude.

My invention relates to a form of epicyclical gearing with mating gears (one internal, the other external) of nearly equal diameters, in which provision has been made by improvements to be described presently, for balancing the centrifugal forces. When desirable, I may make the gearing of the twisted form, which possesses the peculiar property of being rendered more nearly perfect by the mutual wearing of the teeth, and the initial smooth running of which does not require perfectly formed teeth. The advantages of making the two gears of nearly equal diameters is due to the fact that the supporting power of rolling contacts varies inversely with the relative curvature of the contact surfaces, and similarly, the supporting power and the smooth running qualities of gear teeth increase as the relative curvature of the pitch lines approaches zero, that is, as the pitch lines approach coincidence.

Reference is to be had to the accompanying drawings, in which—

Figure 1:
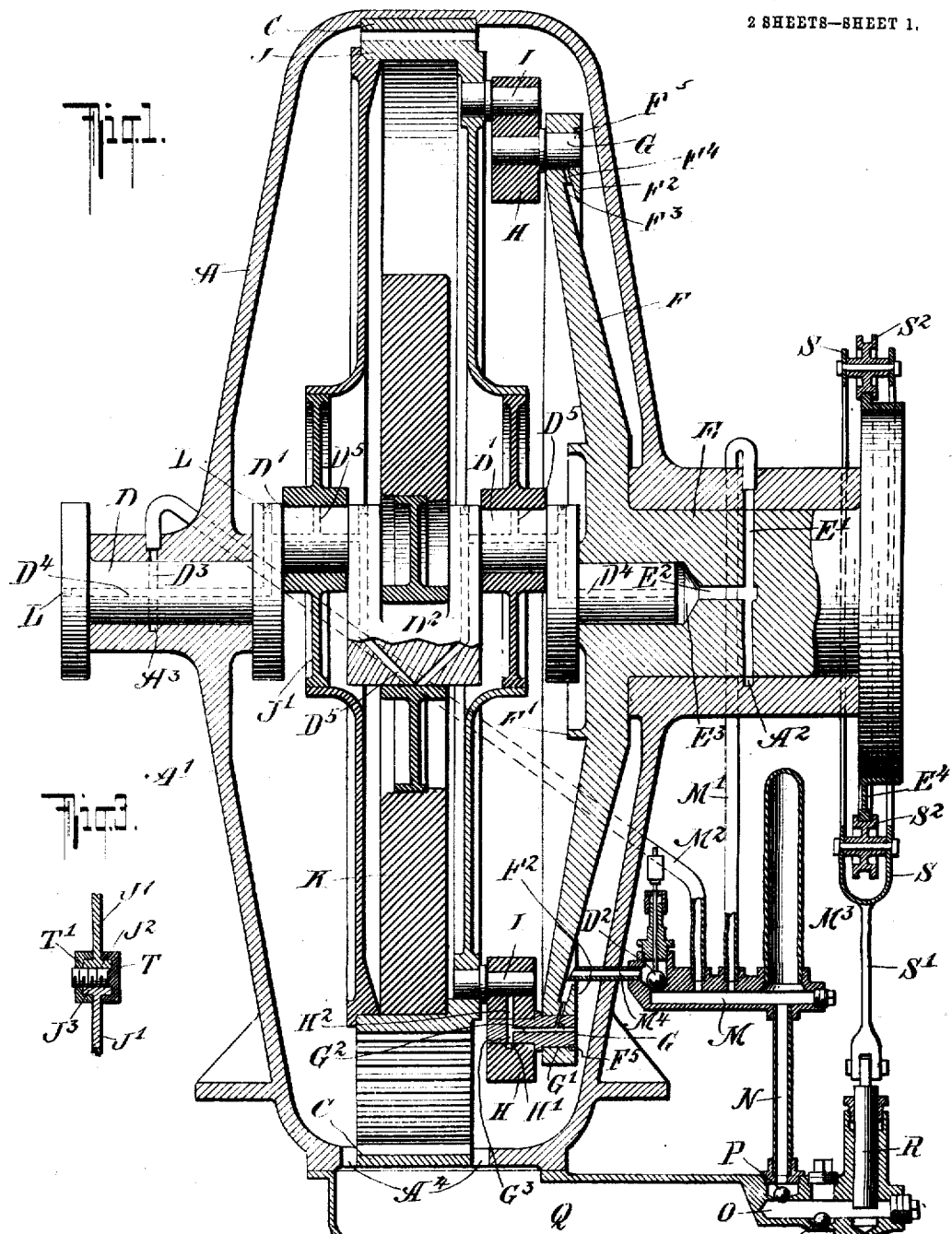
Figure 2:
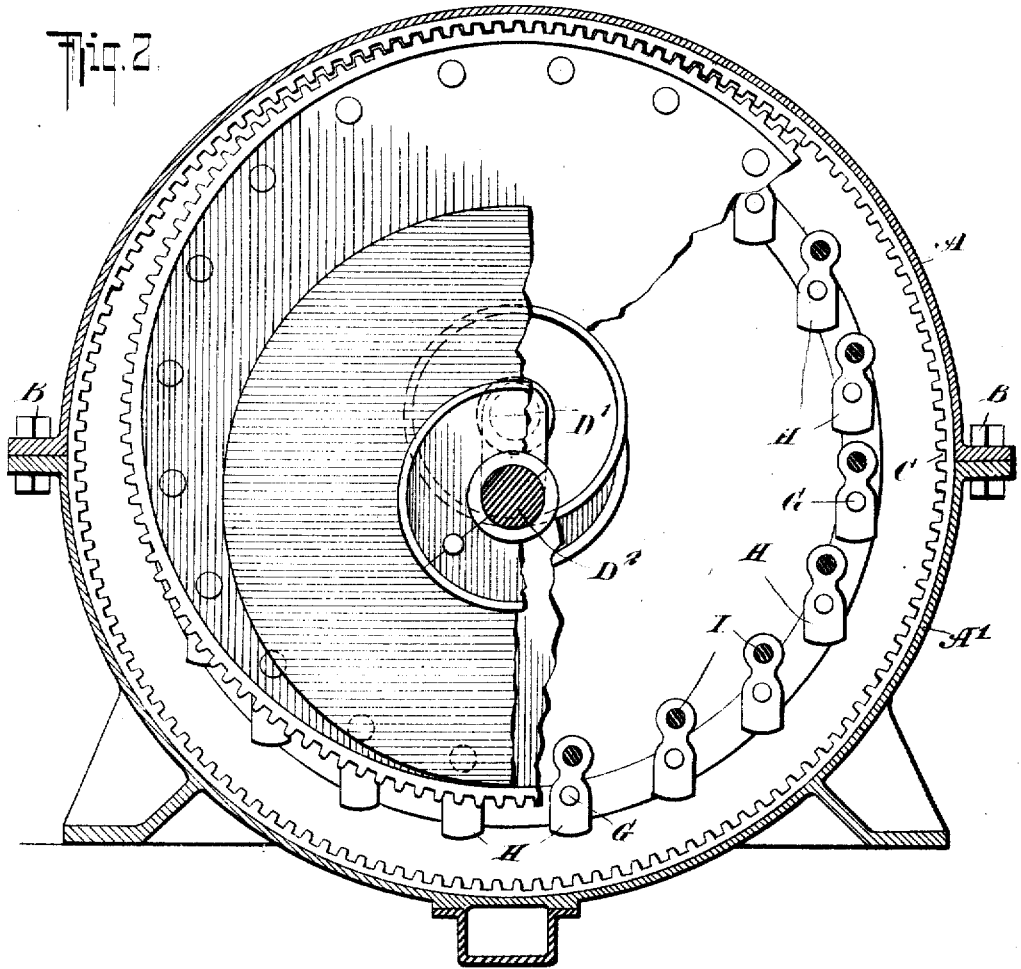
Figure 4:
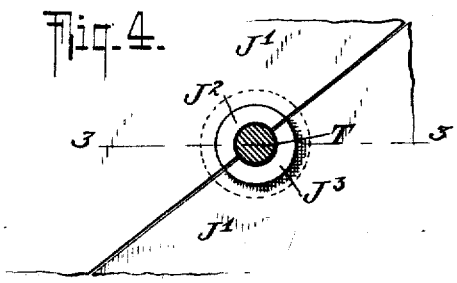

Figure 1 is a sectional elevation of a transmission gearing embodying my invention, Fig. 2 is a cross-section with parts broken away, and Fig. 3 is a sectional detail on line 3—3 of Fig. 4, and Fig. 4 is a partial front view of a sectional plate forming part of the device.

The apparatus comprises a stationary outer casing made in two parts, an upper part A and a lower part A', which are bolted together through flanges on the horizontal center line, as indicated at B. An internally toothed ring C is secured to the inside of said casing, and a driving shaft D is journaled at one end in the outer casing and at the other end in the driven shaft E, also journaled in the outer casing. The driving shaft has two cranks D' of equal throw and angular position and a diametrically opposite middle crank $D^2$. The driven shaft is constructed with, or is secured to, a large disk F located within the outer casing and carrying near its periphery a series of pins G. Turning freely on each of these pins is a balanced drag link H which also turns freely on pins I projecting from a hollow externally toothed gear J supported loosely on the cranks D' and made of the right diameter and pitch to mesh with the stationary internal gear C. The distance between the centers of the pin-receiving apertures in the links H is equal to the radius of the lateral cranks D' of the shaft D. The difference of pitch diameter of the mating gears C and J is evidently equal to the diameter of the circle described by the center of the hollow gear during the revolution of the driving shaft D. The pins I correspond in number and location to the pins G. The disk F of the driven shaft is provided with a lip F' for centering it accurately in relation to the hollow gear J, so that the two series of holes in the disk F and the gear J respectively for the reception of the pins G and I respectively can be finished at one operation in the process of manufacture, thus insuring identity of location. The drag links H couple the pins I of the hollow gear with the pins G of the driven shaft, each pair of coupled pins occupying the two holes which were coincident during the process of finishing.

The inside circumference of the hollow gear J is turned smooth and cylindrical to afford a track for a rolling counterweight K which turns freely and concentrically on the middle crank D² of the driving shaft D. This counterweight is made of proper diameter to insure a rolling contact with the track provided as above described on the inside of the hollow gear J.

The following mechanism may be provided for an efficient lubrication of the machine:—Annular lubrication channels A² A³ extend in the bearing portions of the outer casing A, A', around the journal portion of the driven shaft E and the opposite journal portion of the driving shaft D respectively. These annular channels communicate respectively with cross-ducts E' and D³ in said journals, and through them with longitudinal ducts E² and D⁴. The duct D⁴ is continued through the entire shaft D, including the cranks D' and D² thereof, and has lubricating ports D⁵ at the crank portions to supply oil to the bearing portions of the hollow gear J and of the rolling weight K. Some of the orifices left at the time the several duct portions are bored out, are closed by screw plugs, as indicated at L, but at the end supported by the driven shaft E, the longitudinal duct D⁴ of the shaft D communicates through the space E³, with the duct E². The annular channels A², A³ receive their supply of lubricant through pipes M', M², connected with a chamber M which may be provided with a wind-chest or regulator M³. The chamber M receives oil through a pipe N from a pump chamber O which has a delivery valve P controlling the outlet to the pipe N, and an inlet valve P' controlling the supply from a collecting and settling tank Q communicating by openings A⁴ with the interior of the casing A, A', so as to receive oil escaping from the bearings. The oil is raised from the tank Q by means of a plunger R driven in any suitable manner, for instance by means of a rod S', pivoted to the plunger and secured to a ring or strap S which is operated by an eccentric E⁴ on the driven shaft E. This eccentric strap may have a rolling contact with the eccentric by means of rollers S² journaled on the ring or strap at suitable intervals.

In order to lubricate the links H and the pins G. I. the chamber M is provided with an outlet M⁴, controlled by a weighted or spring-pressed check valve P². This outlet M⁴ extends over a lip F² extending all around the disk F and forming an annular groove F³ from which ducts F⁴ lead to transverse ducts G' in each of the pins G. The ducts F⁴ and G' are in permanent communication with each other, since the pins are rigidly secured to the disk F, as by means of screw keys F⁵. Each duct G' has a continuation G² which connects by a cross duct G³ with an annular channel H' in the link H. The ducts H² convey oil from said annular channels H' to the pins I.

For the convenience of assembling the machine and dismembering it, the hollow gear J may consist of two opposing members or plates fitted together and also fitted tightly upon hub portions engaging the cranks D' and each consisting of two half-sections J' held together in any suitable manner, as by screws T, Fig. 3, having cupped heads to fit split bosses J² on one side of the sections J' and cupped nuts T' fitting split bosses J³ on the other side. By following the motions of this combination through one right hand revolution of the driving shaft, it will be seen that the hollow gear turns to the left a distance which, measured on its pitch circumference, is equal to the difference between the pitch circumferences of the two gears, and also equal to the circumference of the circle described by the center of the hollow gear. Expressing this motion of the hollow gear as a fractional part of a revolution, the numerator of the fraction will be the radius of the lateral cranks when the denominator is the pitch radius of the hollow gear.

By following the motions through one revolution of the hollow gear, it will be seen that all parts return to their original positions. Hence the driven shaft makes one revolution for one of the hollow gear. The drag links, in fact, serve merely as a flexible coupling preventing any relative rotation but permitting a circular translatory motion of fixed radius between the parts connected.

From the foregoing it is evident that the velocity ratio of the gearing as a whole, i. e., the number of revolutions of the driving shaft per revolution of the driven shaft is equal to the quotient of the pitch radius of the hollow gear divided by the radius of the lateral cranks of the driving shaft. With the proportions as shown in the drawings this ratio is 10 to 1, the parts turning in opposite directions.

When it is attempted to run such a gear as this at high speed, it is found that, compared to the centrifugal forces developed by the rapid wabbling motions of the hollow gear and the counterweight, all other forces sink into insignificance. It now remains to describe the adjustments whereby these centrifugal forces are perfectly balanced and the rubbing surfaces are relieved of all forces except those due to the dead weight of the parts and those necessarily occurring as factors of the power transmitted.

1st. The driving shaft is, by itself, put in perfect static and running balance.

2nd. Each drag-link is balanced with reference to the axis, about which it rotates relatively to the driven shaft, that is, with reference to the pin G.

3rd. The driven shaft, together with its series of pins and a drag-link in place on each, is balanced with reference to its own axis. This balance is of minor importance since the driven shaft revolves at a comparatively slow speed.

4th. The hollow gear with its series of pins is put in static and running balance with reference to its own axis (the running balance being of minor importance) and the center of gravity is brought into the central plane of symmetry which bisects the roller track. This last adjustment is made by putting the gear in static balance about a diameter in its plane of symmetry.

5th. The rolling counterweight is put in static and running balance about its axis of symmetry and in static balance about a diameter in its plane of symmetry.

6th. The weight of the hollow gear and the rolling counterweight are adjusted so that the product obtained by multiplying the weight of each by the radius of the crank on which it turns is the same.

With the above six conditions satisfied, it is evident that the center of gravity of the assembled group comprising the driving shaft, the hollow gear and the counterweight is a fixed point for all possible relative positions of the parts. A similar statement is true regarding the driven shaft and the drag-link group. Hence the center of gravity of the combined groups, which comprise all moving parts, will be a fixed point when the two groups are assembled in the stationary casing. A perfect running balance is of diminishing importance for the several parts in the following order: Driving shaft, drag-links, counterweight, hollow gear and driven shaft. A perfect running balance of each of these parts will, however, insure a perfect running balance of the whole.

It will be seen that the principal inertia forces, those due to the wabbling of the hollow gear and the counterweight respectively, are exactly balanced against each other, through a pressure at the rolling contact between them. Thus the cranks of the driving shaft are relieved of all pressure except that due to the dead weight and the pressure which occurs as a factor of the horse power transmitted. The only inertia forces producing journal friction are the centrifugal forces developed by the weights of the drag-links revolving about the center of the driven shaft at the speed of the latter and producing friction on the pins C about which the drag-links are balanced.

Regarding the forces other than those of inertia and dead weight it is worthy of note that the system of forces acting between the driven shaft and the hollow gear resolves itself into a pure torque. The same is true of the system of forces exerted by the casing and the driving shaft on the hollow gear, the hollow gear is therefore subjected to two equal and opposite torques. And since a torque is a vector quantity, and as such has no position, it follows that nothing is sacrificed by placing the drag-links in a plane at one side of the gears.

The arrangement and connection of the drag-links as shown with the pins G, I, supported at opposite sides of the drag-links, is of advantage in that it insures the parallelism of the two pins when both are sprung by the force transmitted by the drag-link; thus a smaller diameter of pins is permissible than would be possible otherwise.

It is evident from the description of the method followed in finishing the two series of holes for the pins G, I, that these holes are not necessarily spaced at equal intervals around the circumference of a circle nor indeed are they necessarily on the circumference of a circle at all.

Instead of the drag links I may use any one of several well known equivalent couplings or connections between the parts J and F.

In choosing contours for the gear teeth I do not confine myself to those forms appropriate to an interchangeable series, but I make use of tooth forms well known to be most appropriate for this particular case. And I may employ twisted gears in order to avail myself of their well known smooth running qualities. Finally I may employ an inverted form of the mechanism hereinbefore described by transposing the drag-links and gear connections in which case the drag-links would become a coupling between the hollow gear and the stationary casing while the internally toothed ring would become an integral part of the driven shaft. This inversion is perhaps better described as a reversal of the functions of the driven shaft and the stationary casing. Thus consider E the stationary member and A the driven member. With the lubricating attachments removed, the drawings, as they stand, illustrate the inversion contemplated.

I claim:

1. A power-transmission gearing, comprising a frame or casing, two co-axial shafts supported by said frame, one of said shafts being provided with a middle crank and with two lateral cranks of equal throw and diametrically opposed to the middle crank, a hollow gear supported on the lateral cranks and provided with an interior track, a counterweight in engagement with the middle crank and with the said track, a stationary gear in engagement with the said hollow gear, and a connection between the other shaft and hollow gear.

2. A power-transmission gearing, comprising a frame or casing, two co-axial shafts supported by said frame, one of said shafts being provided with a middle crank and with two lateral cranks of equal throw and diametrically opposed to the middle crank, a hollow gear supported on the lateral cranks, and provided with an interior track, a counterweight in engagement with the middle crank and with the said track, a stationary gear in engagement with the said hollow gear, a disk secured to the other shaft, pins projected from the said disk and from the hollow gear respectively, and drag links connecting said pins.

3. A power-transmission gearing, comprising a frame or casing, two co-axial shafts supported by said frame, one of said shafts being provided with a middle crank and with two lateral cranks of equal throw and diametrically opposed to the middle crank, a hollow gear supported on the lateral cranks and provided with an interior track, a counterweight in engagement with the middle crank and with the said track, a stationary gear in engagement with the said hollow gear, a disk secured to the other shaft adjacent to one face of the hollow gear, pins projected toward each other from the disk and hollow gear respectively, and drag links located between the disk and hollow gear and connecting said pins.

4. A power-transmission gearing, comprising a frame or casing, two co-axial shafts supported by said frame, an internal gear on the frame, a smaller gear in mesh therewith and loosely connected with an eccentric portion on one of the shafts, said smaller gear being provided with a track, a counterweight arranged to run on said track, pins connected with the other shaft and projected toward said smaller gear, pins projected from the smaller gear and parallel with the first-mentioned pins, and drag links for connecting one series of pins with the other.

5. A power-transmission gearing, comprising a frame or casing, two co-axial shafts supported by said frame, one of said shafts having a middle crank and two lateral cranks of equal throw and diametrically opposed to the middle crank, a hollow gear supported on the lateral cranks and provided with an interior track, a counterweight in engagement with said track and with the middle crank, and means for transmitting motion from the hollow gear to the other shaft.

6. A power-transmission gearing, comprising a frame or casing, two co-axial shafts supported by said frame, one of said shafts having an eccentric portion, a gear supported by said eccentric portion and provided with a track, a counterweight arranged in engagement with said track, and two connecting elements for said gear, viz: a series of drag links and a meshing gear, one of said elements being secured to the frame, and the other to the second shaft.

7. A power-transmission gearing, comprising a frame or casing, two co-axial shafts supported by said frame, one of said shafts having an eccentric portion, a hollow gear supported by said eccentric portion and provided with an interior track, a counterweight arranged to roll on said track, and two connecting elements for connecting said gear with the frame and with the second shaft respectively.

8. A power-transmission gearing, comprising a frame or casing, two co-axial shafts supported by said frame, one of said shafts having an eccentric portion, a gear supported by said eccentric portion and provided with a track, a counterweight in engagement with said track, and two connecting elements for connecting said gear with the frame and with the other shaft respectively.

9. A power-transmission gearing, comprising a frame or casing, two co-axial shafts supported by said frame, one of said shafts having an eccentric portion, a gear supported by said eccentric portion and provided with a track, a counterweight arranged in engagement with said track, and two connecting elements for connecting said gear with the frame and with the other shaft respectively, one of said elements being constructed to prevent rotation of the gear relatively to the part to which it is connected by such element, and the other element being constructed to permit a relative rotation of the parts connected thereby.

10. A power-transmission gear, comprising a frame or casing, a driving shaft supported therein and provided with eccentric portions arranged in diametrically opposed positions, said shaft being in static and running balance, a gear supported on one of said eccentric portions, and provided with a track, a counterweight in engagement with said track and with the opposed eccentric portion of the driving shaft, a driven shaft, and means for transmitting motion from the gear to the driven shaft.

11. A power-transmission gear, comprising a frame or casing, a driving shaft supported therein and provided with eccentric portions arranged in diametrically opposed positions, said shaft being in static and running balance, a gear supported on one of said eccentric portions and provided with a track, a counterweight in engagement with said track and with the opposed eccentric portion of the driving shaft, a driven shaft, links pivotally connected with the driven shaft and with said gear, and balanced with reference to the axes of the pivots connecting them with the driven shaft, and a stationary gear in mesh with the first-named gear.

12. A power-transmission gear, comprising a frame or casing, a driving shaft supported therein and provided with eccentric portions arranged in diametrically opposed positions, said shaft being in static and running balance, a gear supported on one of said eccentric portions, and provided with a track, a counterweight in engagement with said track and with the opposed eccentric portion of the driving shaft, a driven shaft, a series of pins connected with said driven shaft, links pivotally mounted on said pins and balanced with reference thereto, pins for pivotally connecting the gear with said links, and a stationary gear in mesh with the first-named gear.

13. A power-transmission gear, comprising a frame or casing, a driving shaft supported therein and provided with eccentric portions arranged in diametrically opposed positions, said shaft being in static and running balance, a gear supported on one of said eccentric portions and provided with a track, a counterweight in engagement with said track and with the opposed eccentric portion of the driving shaft, a driven shaft, a series of pins connected with said driven shaft, links pivotally mounted on said pins and balanced with reference thereto, the driven shaft, together with its series of pins and links, being balanced with reference to its own axis, means for pivotally connecting said links with the gear, and a stationary gear in mesh with the first-named gear.

14. A power transmission gear, comprising a frame or casing, a driving shaft supported therein and provided with eccentric portions arranged in diametrically opposed positions, said shaft being in static and running balance, a gear supported on one of said eccentric portions and provided with a track, a counterweight in engagement with said track and with the opposed eccentric portion of the driving shaft, a driven shaft, links pivotally connected with the driven shaft, pins for connecting said links pivotally with the said gear, the latter, together with the pins, being in static balance with reference to its own axis, and a stationary gear in mesh with the first-named gear.

15. A power transmission gear, comprising a frame or casing, a driving shaft supported therein and provided with eccentric portions arranged in diametrically opposed positions, said shaft being in static and running balance, a gear supported on one of said eccentric portions and provided with a track, a counterweight in engagement with said track and with the opposed eccentric portion of the driving shaft, a driven shaft, links pivotally connected with the driven shaft, pins for connecting said links pivotally with the said gear, the latter, together with the pins, being in static balance with reference to its own axis, and having its center of gravity in the plane of the center of gravity of the counterweight, and a stationary gear in mesh with the first-named gear.

16. A power-transmission gear, comprising a frame or casing, a driving shaft supported therein and provided with eccentric portions arranged in diametrically opposed positions, a gear supported on one of said eccentric portions and provided with a track, a counterweight in engagement with said track and with the opposed eccentric portion of the driving shaft, the said counterweight being in static and running balance about its axis of symmetry and in static balance about a diameter in its plane of symmetry, a driven shaft, and means for transmitting motion from the gear to the driven shaft.

17. A power transmission gear, comprising a frame or casing, a driving shaft supported therein and provided with eccentric portions arranged in diametrically opposed positions, a gear supported on one of said eccentric portions and provided with a track, a counterweight in engagement with said track and with the opposed eccentric portion of the driving shaft, the product of weight multiplied by the radius of eccentricity being the same for said counterweight and for the gear engaged thereby, a driven shaft, and means for transmitting motion from the gear to the driven shaft.

18. A power transmission gear, comprising a frame or casing, a driving shaft and a driven shaft journaled therein in alinement with each other, the driving shaft being also journaled in the driven shaft, and being provided with diametrically opposed eccentric portions, a hollow gear engaged with one of said eccentric portions and having a track, a counterweight engaged with the other eccentric portion of the driving shaft, and also in engagement with said track, a stationary gear in engagement with the said first named gear, and connections between the first named gear and the driven shaft.

19. A power transmission gear, comprising alining shafts, one of which is supported in the other at one end, a casing in which said shafts are journaled, one of the shafts being provided with diametrically opposed eccentric portions, a gear supported on one of said portions, and provided with a track, a counterweight supported on the other eccentric portion and engaged with said track, and means for transmitting motion from the said gear to the other shaft.

20. In a power transmission gear the combination with the driving shaft, the driven shaft, mechanism for transmitting motion from one shaft to the other, and a casing having bearings for said shafts, the shafts as well as the bearings being provided with lubricating ducts, of a collecting tank into which the lubricant escaping from the bearings is adapted to flow, and a pump for returning the lubricant from said collecting tank to the bearings.

21. A power transmission gearing, comprising a driving shaft having diametrically opposed cranks, and provided with lubricating channels having orifices at said cranks, a hollow gear provided with an internal track and with a hub in engagement with one of said cranks, a counterweight in engagement with the other crank and with said track of the hollow gear, a driven shaft in axial alinement with said driving shaft and operatively connected with the hollow gear, a casing having a stationary gear in engagement with the hollow gear and provided with bearings for the said shafts, said bearings having ducts connected with those of the shafts, and means for supplying a lubricant under pressure to the said ducts of the bearings and shafts.

22. In a power transmission gear a driven shaft provided with a disk having an annular channel, a driving shaft, means for transmitting motion from the driving shaft to the driven shaft, said means having lubricating channels in connection with the annular channel of said disk, a lubricating spout extending adjacent to the said disk and adapted to feed lubricant into the channel of the disk as the disk rotates, and means for feeding lubricant to said spout.

23. A power transmission gear comprising a frame or casing, a shaft supported therein and provided with eccentric portions arranged in diametrically opposed position, a wheel mounted on each eccentric portion, the two wheels being in rolling contact with each other and the whole in static and running balance.

In testimony whereof, I have hereunto signed my name in the presence of two subscribing witnesses.

HARVEY D. WILLIAMS.

Witnesses:
CHAS. R. BURR,
RICHD. R. BRIGHT.